United States Patent [19]

Stewart

[11] 4,375,876
[45] Mar. 8, 1983

[54] OVERHEAD SLIDING DOOR AND FOLDABLE CABIN PANEL ASSEMBLY FOR AN AIRPLANE

[75] Inventor: William L. Stewart, Everett, Wash.

[73] Assignee: The Boeing Company, Seattle, Wash.

[21] Appl. No.: 270,260

[22] Filed: Jun. 4, 1981

[51] Int. Cl.³ .............................................. B64C 1/14
[52] U.S. Cl. .................................. 244/129.5; 160/201
[58] Field of Search .......... 244/129.5, 137 P, DIG. 2; 49/40, 41, 215; 160/37, 189, 201; 296/146

[56] References Cited

U.S. PATENT DOCUMENTS

| | | | |
|---|---|---|---|
| 1,603,182 | 10/1926 | Aborn | 296/146 |
| 1,622,839 | 1/1927 | Shields . | |
| 2,141,298 | 12/1938 | Heinz | 296/146 |
| 2,499,749 | 3/1950 | Hilliard et al. | 296/146 |
| 2,535,347 | 12/1950 | Blackman | 296/146 |
| 2,689,766 | 9/1954 | Blackman | 296/146 |
| 2,973,221 | 2/1961 | Blackman | 296/146 |
| 3,052,496 | 9/1962 | Frey | 296/146 |
| 3,169,282 | 2/1965 | Godwin . | |
| 3,416,757 | 12/1968 | Maraghe | 244/129.5 |
| 3,585,757 | 6/1971 | Ritchie et al. | 49/215 |
| 3,802,125 | 4/1974 | Baker | 49/40 |
| 3,927,709 | 12/1975 | Anderson et al. | 160/37 |
| 4,106,729 | 8/1978 | Bergman et al. | 244/137 P |

*Primary Examiner*—Charles E. Frankfort
*Attorney, Agent, or Firm*—Christensen, O'Connor, Johnson & Kindness

[57] ABSTRACT

An overhead sliding door and foldable interior panel assembly for an airplane is disclosed. The assembly is particularly adapted for commercial airliners having a low ceiling and limited overhead space for stowage of the door above the cabin ceiling. The assembly includes a set of foldable cabin panels that operate to cover the overhead ceiling opening when the door is closed. As the door is opened by sliding upwardly along tracks through the ceiling opening, the foldable panels are engaged by the door and swung upwardly and inwardly with the door into the overhead space above the ceiling. Conversely, the foldable panels are brought into place to cover the ceiling opening as the door is brought downwardly to its closed position in the doorway. The door and the foldable panels are adapted to occupy a minimum of space in the overhead stowage compartment to thereby accommodate control cables, ducting and various other items in the overhead compartment. In the preferred embodiment, the door includes an integral escape slide container that is adapted to form a presentable closure member in the ceiling opening when the door is raised to the overhead stowed position, such that the ceiling opening is effectively closed with the door in the closed position as well as with the door in the open position.

13 Claims, 14 Drawing Figures

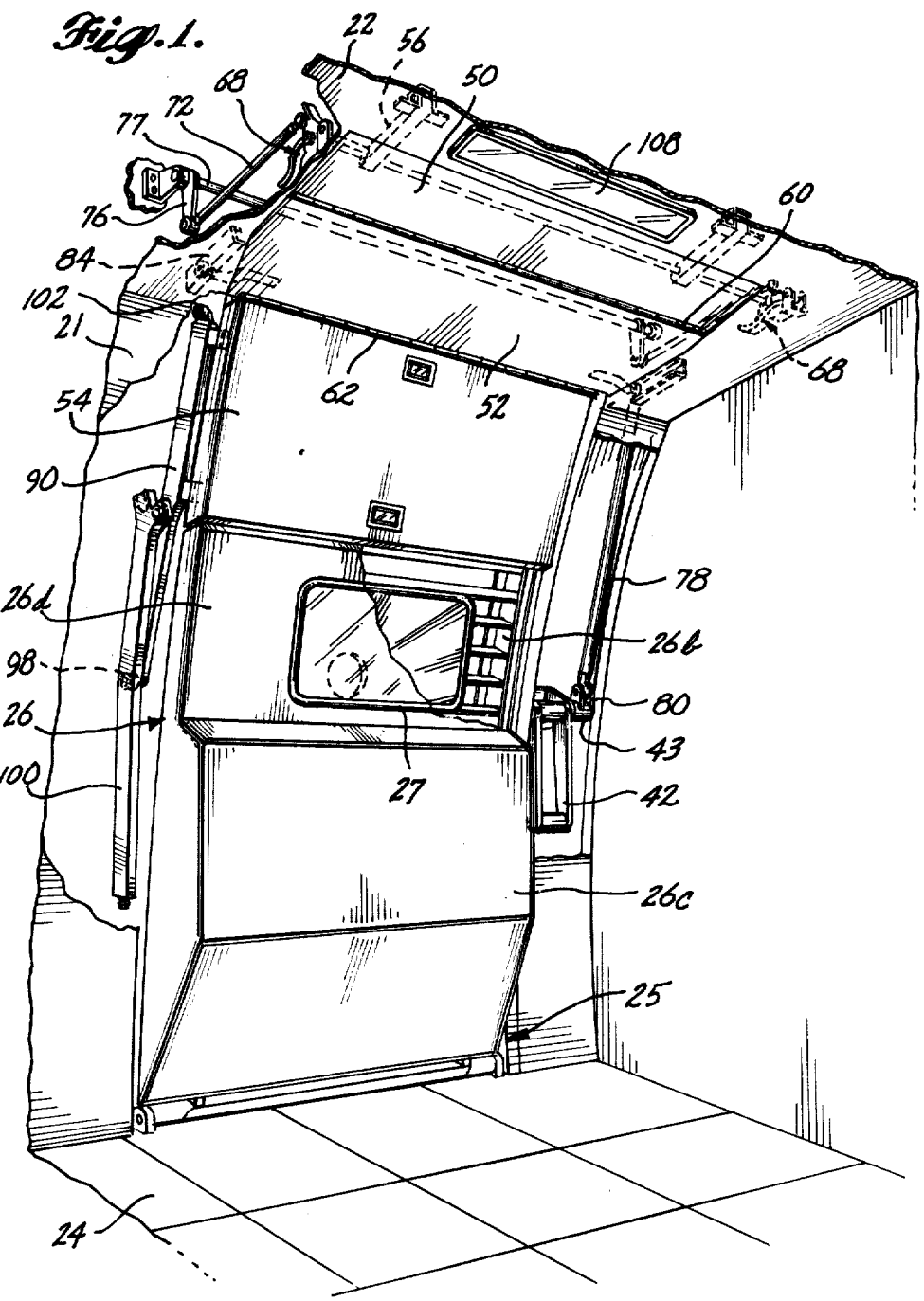

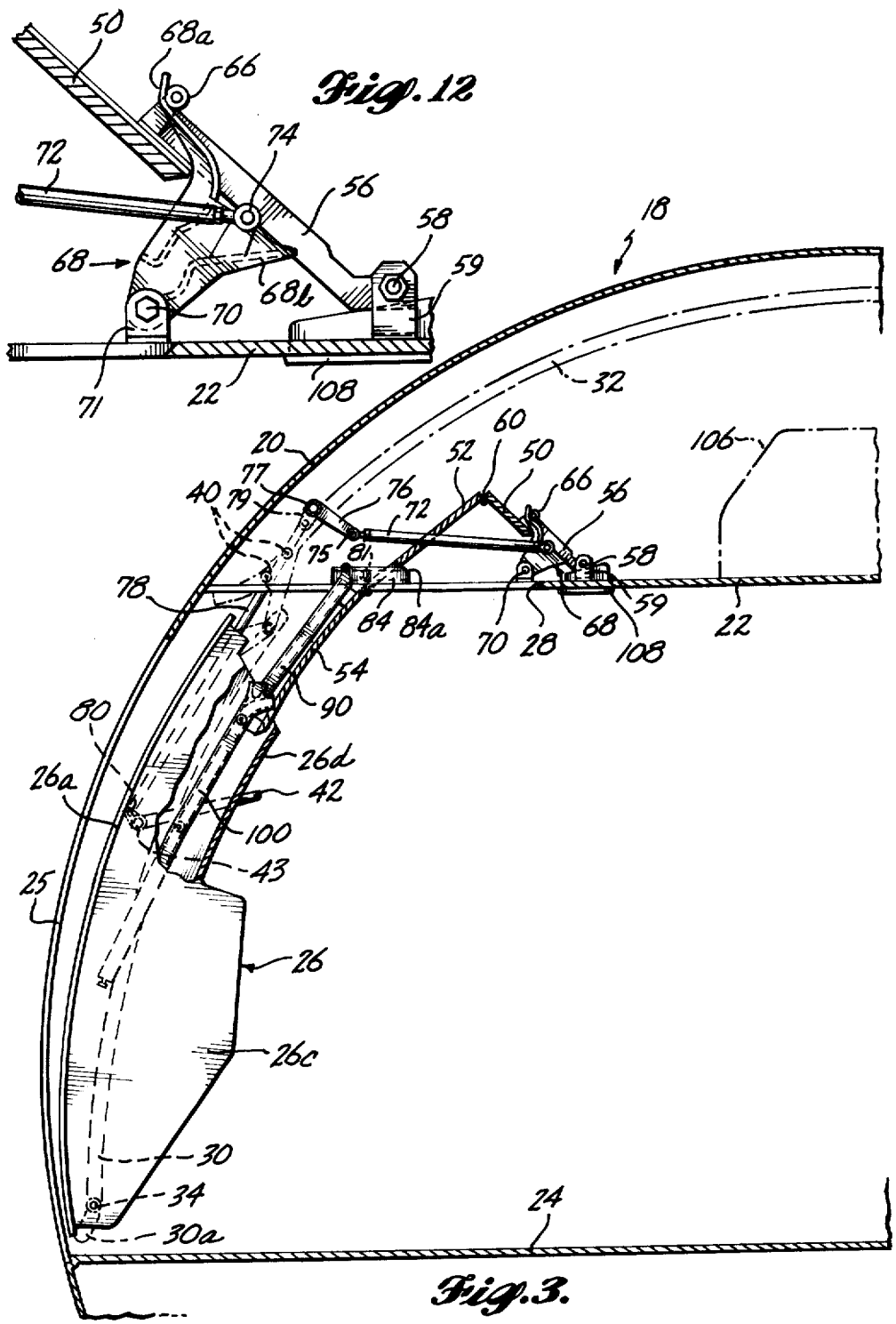

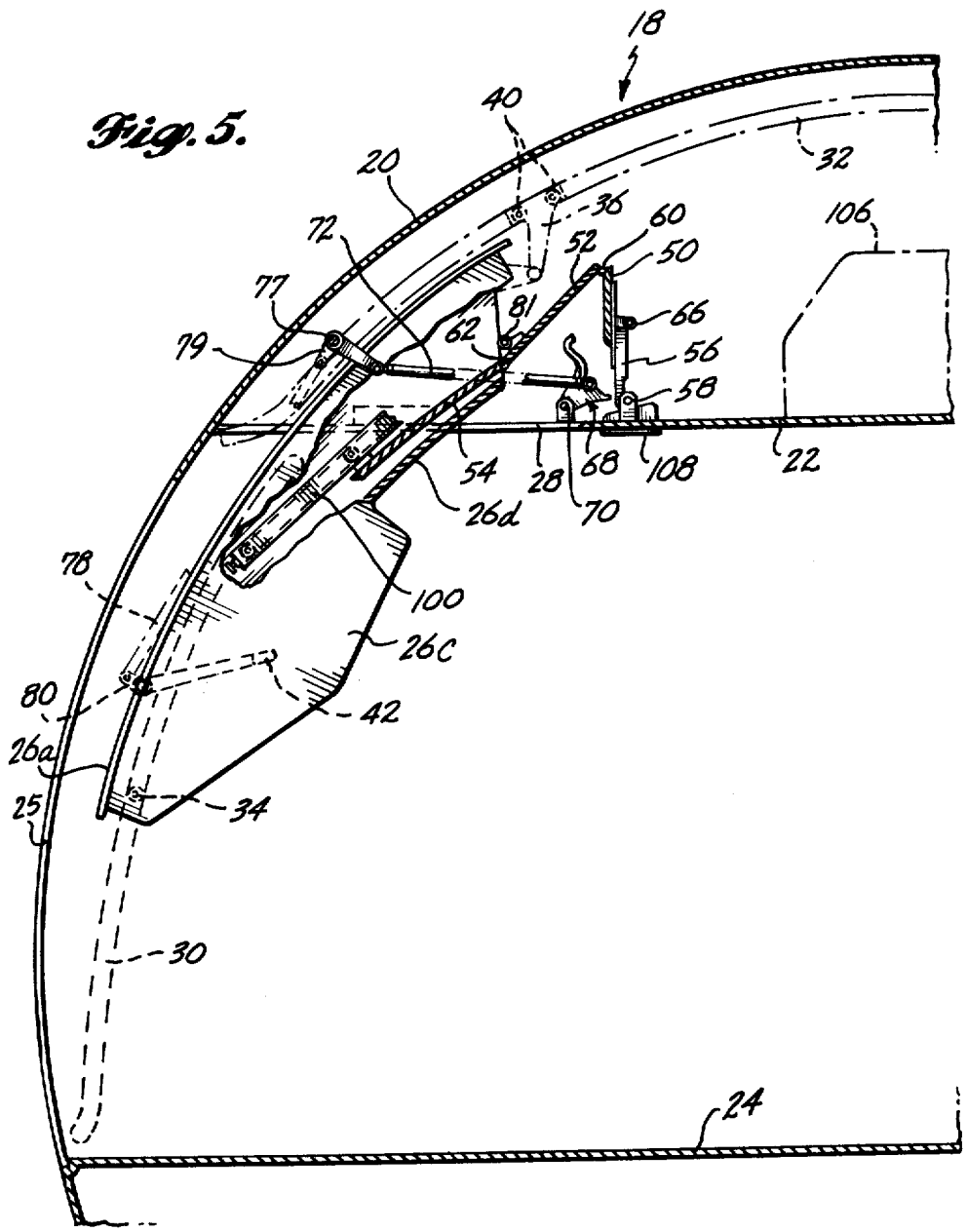

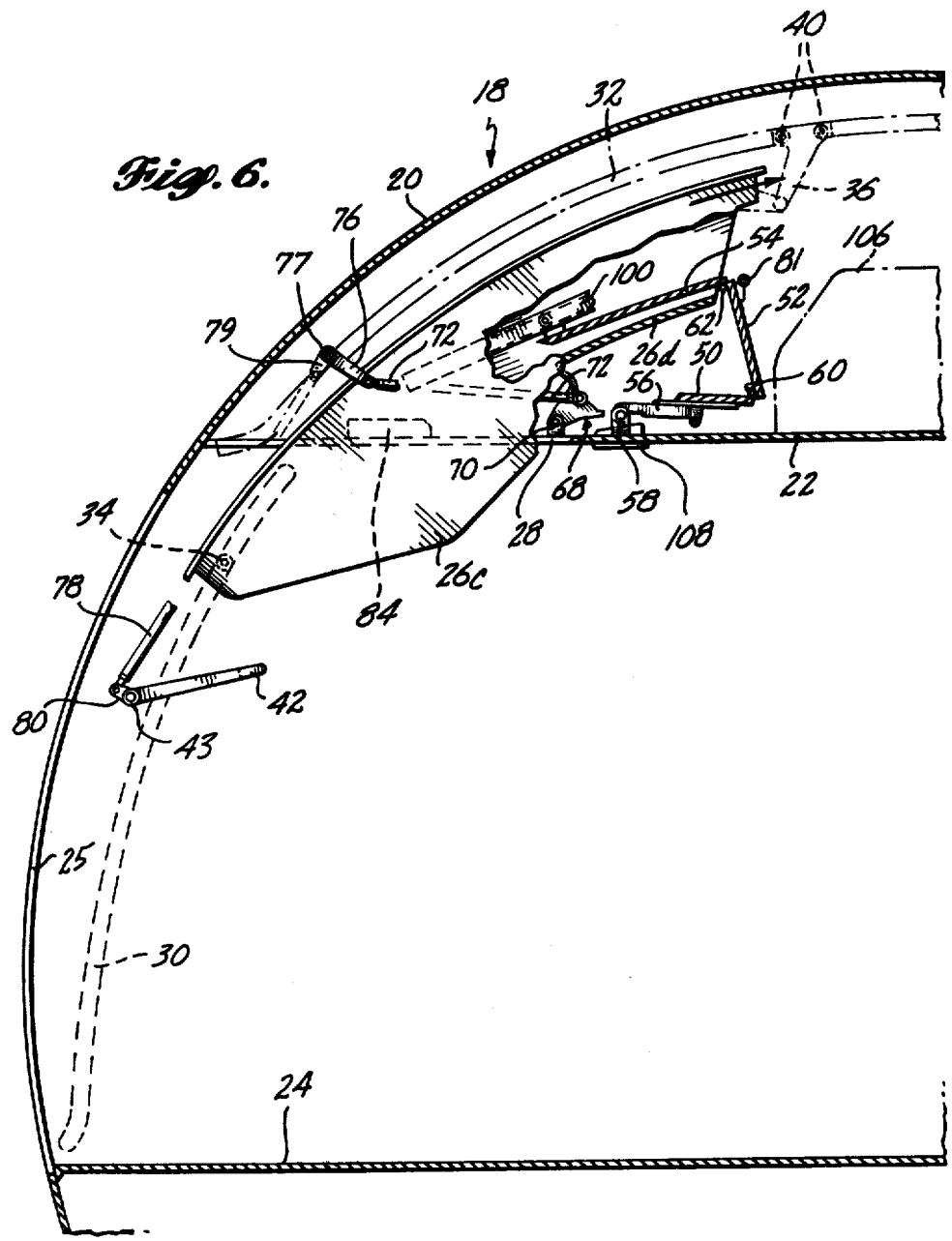

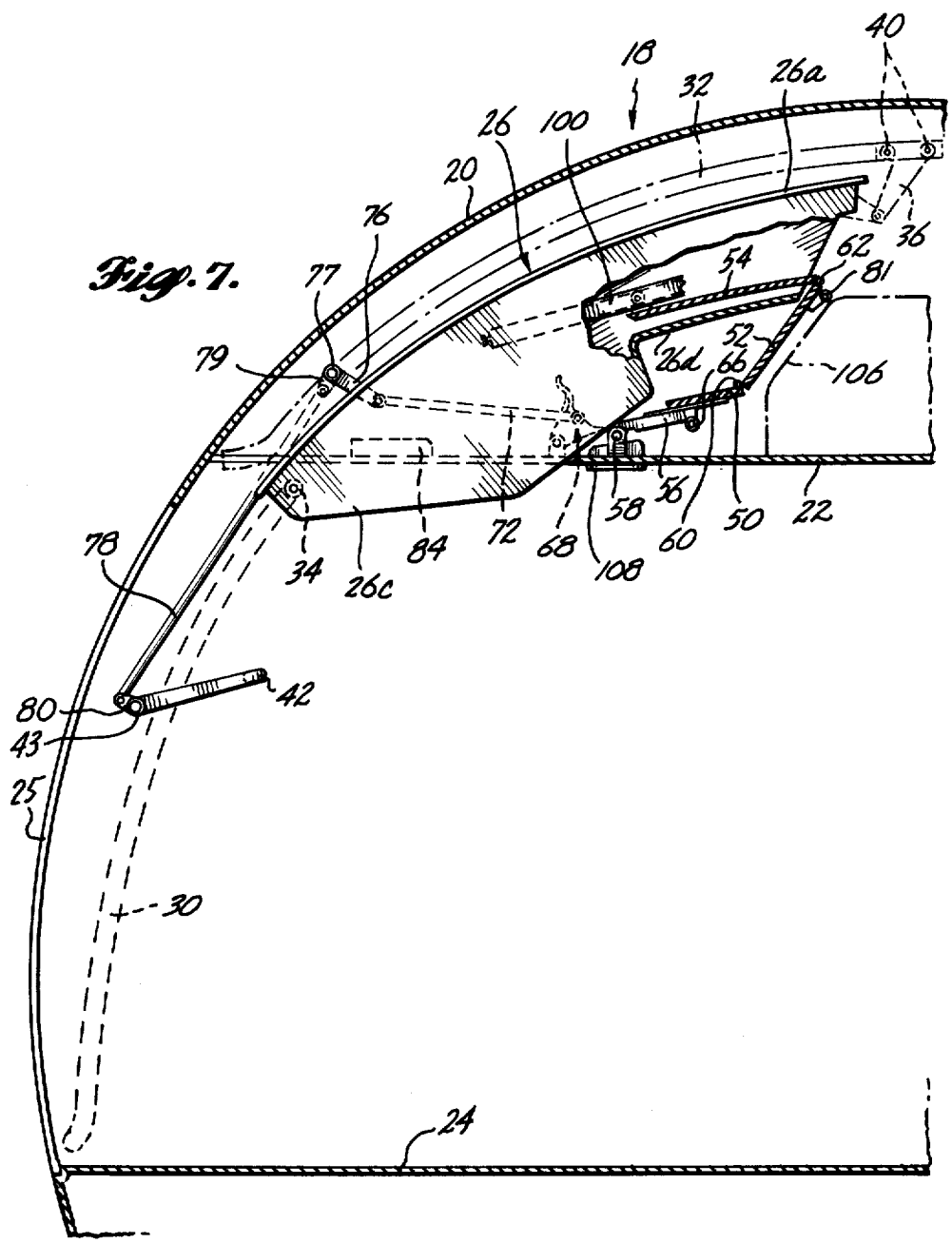

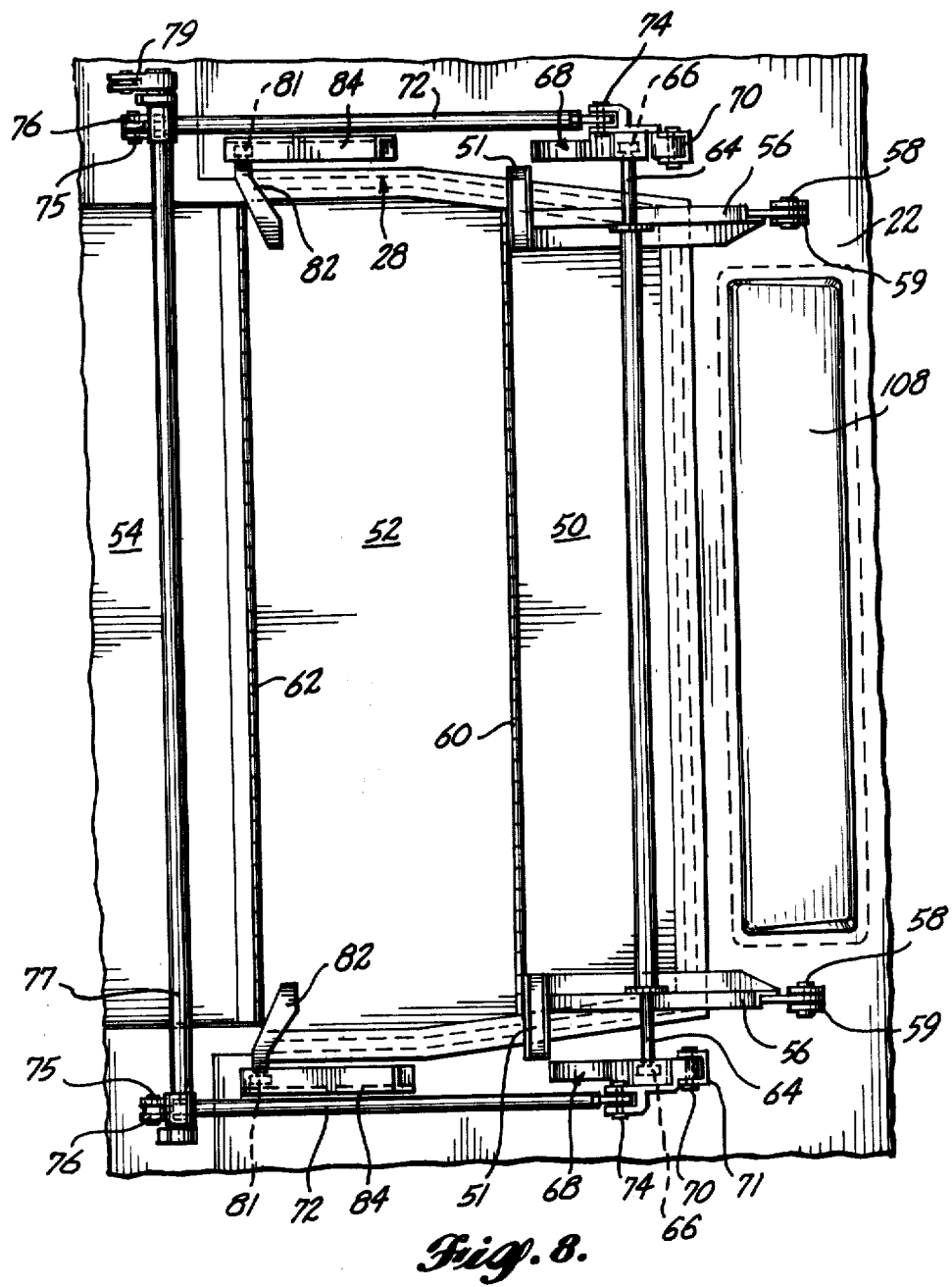

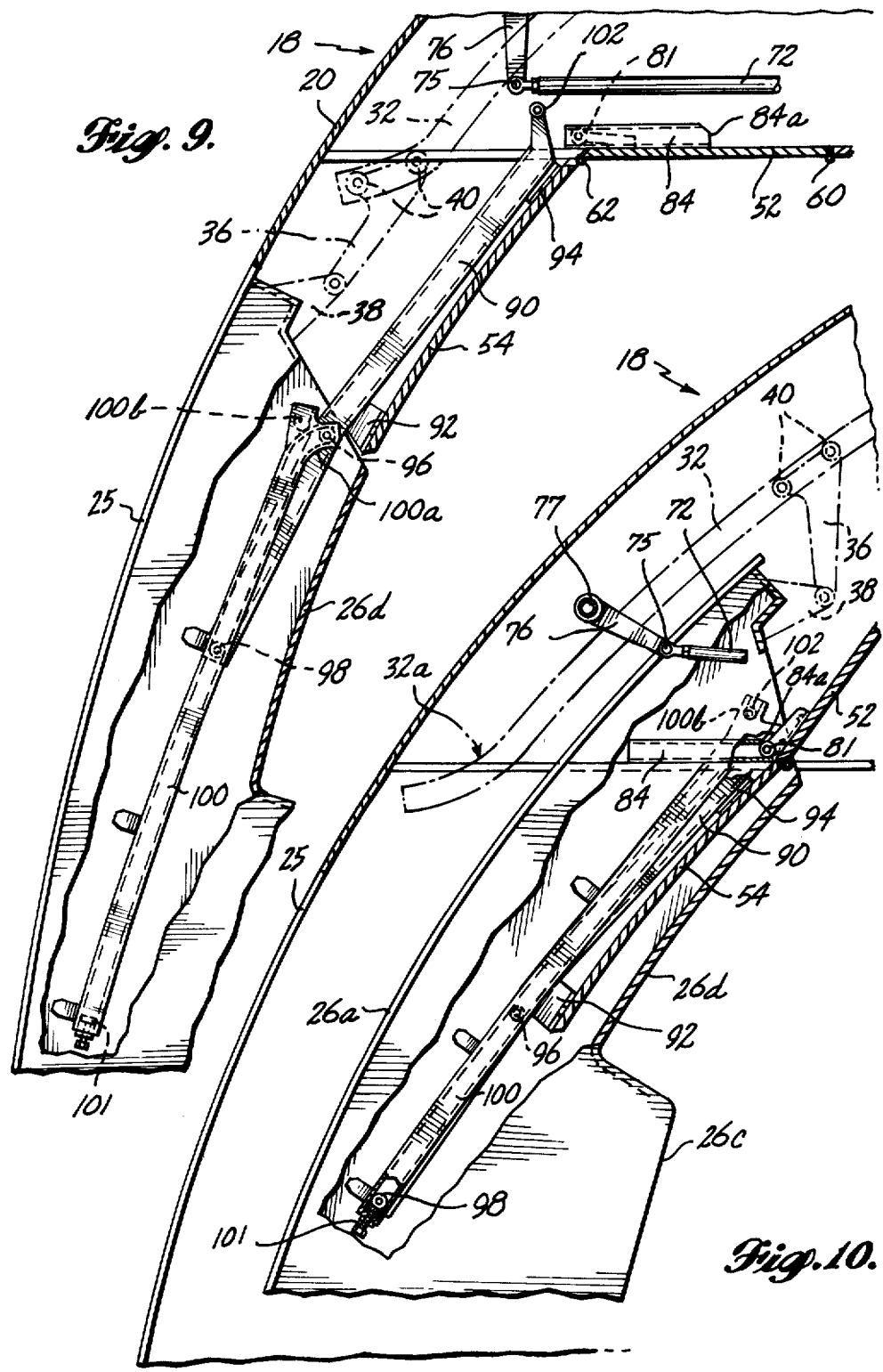

OVERHEAD SLIDING DOOR AND FOLDABLE CABIN PANEL ASSEMBLY FOR AN AIRPLANE

BACKGROUND OF THE INVENTION

The present invention relates generally to door assemblies and, more particularly, to overhead sliding door assemblies and associated interior paneling for airplanes.

Overhead sliding passenger doors are commonly employed in the main passenger doorways of commercial airliners. Such a door is opened by raising it upwardly over the doorway on tracks affixed to the inside of fuselage. The raised door is thereby stowed out of the way in an overhead position. The door is ordinarily passed through an opening in the cabin ceiling and stowed out of sight in an overhead space above the ceiling.

The overhead sliding door is particularly suited to an airliner because the curved contour of the fuselage conveniently accommodates the similarly curved door, enabling the door to fit closely against the inside of the fuselage during opening and closing. As a result, the primary advantage over a conventional hinged door is that the overhead sliding door does not have to be swung open inwardly into the occasionally crowded passenger cabin area, or swung outwardly in an awkward manner by an operator standing inside the airplane. Examples of overhead sliding door assemblies are disclosed in U.S. Pat. Nos. 4,106,729 to Bergman et al. and 3,802,125 to Baker, which are hereby incorporated by reference. Although the practical advantages of overhead sliding doors are well recognized in the aircraft industry, they pose particular design problems in connection with the placing of interior wall and ceiling paneling above the doorway, as discussed further below.

For example, there is the problem of providing a suitable closure member for the ceiling opening over the doorway. Such a closure member is necessary for purposes of apearance and air circulation control when the door is down, and must be removable to permit the door to pass through the ceiling opening. Further, the closure member must be movable conjointly with the door assembly so that the operator does not have to move the ceiling closure member each time the door is opened and closed.

Further, in the door assembly disclosed in the above-referenced patent to Bergman et al., there is affixed to the lower inside of the door an escape slide enclosed in a rigid container. In an emergency, the escape slide can be deployed outwardly through the doorway and inflated to form a semirigid escape slide extending to the ground. The folded escape slide and its container are somewhat bulky and extend inwardly into the cabin area approximately eight inches from the inside of the door. This inward protrusion of the escape slide container, together with the inward movement of the entire door that is necessary for it to clear the doorway before sliding upwardly on its tracks, requires that the ceiling opening be of substantial size. This further accentuates the need for a removable closure member and also makes it desirable to have a means for closing the ceiling opening when the door is raised, as well as when the door is lowered.

Additionally, in airplanes wherein the top of the doorway is lower than the cabin ceiling, there is a need for a presentable, removable interior panel to cover the fuselage wall above the doorway. This portion of the fuselage wall ordinarily includes door tracks and various mechanical linkages that would otherwise be visible with the door in the closed position and would be unsightly in a passenger airliner. In order to accommodate upward movement of the door, however, such a panel must be movable out of the way when the door is raised. One solution to this problem would be to make such a panel integral with the door, such that the panel travels upwardly with the door when the door is raised. This approach is not feasible in certain cases, however, because the combined height of the door and such an integral overhead panel is too great for the door to be stowed in the overhead space above the cabin ceiling, particularly in view of certain additional problems discussed below.

Another particular problem to which the present invention is directed is the stowage of an overhead sliding door in the limited overhead space available in medium-sized airliners having fuselages of relatively small diameter. The overhead stowage space in such airliners, for example a Boeing 767 airplane, is crowded with control cables, ducting, electrical wiring, lights and other items. Under such conditions, it has not been feasible to provide a simple trap door in the ceiling through which the door and its associated interior panels can be raised, as has been done in larger airliners having a larger overhead stowage space.

Also, in airplanes of relatively small fuselage diameter it has proven difficult to provide a pair of full-length overhead sliding doors disposed in the sides of the fuselage opposite one another, since there is insufficient room in the overhead compartment for both doors and their associated paneling to be raised at once without interfering with one another. A simple alternative in such a case would be to offset the doors along the fuselage. This solution is not altogether satisfactory, however, because it is desirable for the doors to be symmetrically positioned on opposite sides of the airplane to accommodate standardized passenger boarding facilities, and because of other design considerations.

Accordingly, it is the object and purpose of the present invention to provide a combined door and interior cabin panel assembly that includes a presentable panel closure member for the overhead opening of the cabin ceiling when the door is in its closed position, and which also allows the door to be opened inwardly and raised upwardly through the opening to a stowed position above the cabin ceiling. More particularly, it is an object to provide such an assembly wherein a set of foldable cabin panels are coupled to the door and adapted to fold upwardly out of the way as the door is opened.

It is also an object to provide an overhead sliding door and panel assembly that includes a movable interior fuselage panel that covers the fuselage wall above the doorway when the door is closed, and which is movable upwardly out of the way when the door is raised.

It is another object of the present invention to achieve the foregoing objects and also provide an overhead sliding door and interior panel assembly that operates to form a closure member in the ceiling opening when the door is raised to its overhead stowed position.

It is yet another object to provide an overhead sliding door and interior panel assembly particularly adapted to a relatively small commercial airliner having limited overhead stowage space. In particular, it is an object to provide a full-length door assembly and associated interior paneling that can be stowed overhead in a sufficiently compact condition to permit another similar door assembly to be located on the opposite side of the fuselage, and wherein both doors may be raised to the open position simultaneously.

SUMMARY OF THE INVENTION

In accordance with the foregoing objects and other objects that will become apparent to one of ordinary skill in the art upon reading the following specification, the present invention is directed to a combined door and interior panel assembly for an exterior doorway of a convexly contoured vehicle fuselage, such as that of an airplane. The door and panel assembly is particularly adapted for a vehicle having an interior cabin ceiling extending horizontally within the fuselage body. The assembly includes an overhead sliding door and a set of foldable interior panels coupled thereto. The door travels on tracks affixed to the inside of the fuselage. The door is movable between a closed position, occupying the doorway, and an open, stowed position wherein at least a major portion of the door is located above the ceiling. The foldable panels are configured to close the opening in the ceiling with the door in the closed position, and are coupled to the door so as to fold upwardly out of way into the overhead space above the ceiling as the door is raised to its stowed position. The foldable panels also cover the fuselage wall immediately above the doorway when the door is lowered to its closed position. The entire assembly forms an effective and presentable closure system for both the doorway in the fuselage and the opening in the ceiling. With appropriate counterbalance tensioning to assist in raising the door, the door and foldable panel assembly can be easily opened and closed by an operator with a single, uninterrupted movement.

The foldable panels include an inboard ceiling panel, an outboard ceiling panel, and a side panel. The three panels are hinged together edgewise for relative folding motion. With the door closed, the side panel covers the fuselage wall over the doorway and extends upwardly to the opening in the ceiling. The outboard ceiling panel is hinged to the upper edge of the side panel and covers the outboard half of the ceiling opening. The inboard ceiling panel is hinged to the outboard ceiling panel along a fore and aft hinge line so as to cover the inboard half of the ceiling opening. The inboard ceiling panel is pivotably coupled on its inboard side to the cabin ceiling for upward swinging motion.

When the door is raised to its stowed position, the panels are engaged with the door through a lost-motion coupling mechanism and folded upwardly into the overhead space above the cabin ceiling. In accordance with another aspect of the invention, the opening in the ceiling is closed when the door is raised by a lower portion of the door that is adapted to presentably cover the ceiling opening. Thus, the ceiling opening is closed when the door is lowered as well as when it is raised.

As already noted, the door moves between a closed position in the doorway and a stowed position wherein the door is raised upwardly into the overhead space above the cabin ceiling. As the door is opened, the door tracks guide the door first inboard several inches to clear the doorway and then upwardly along the inside of the fuselage wall. During the initial upward movement of the door, the side panel remains relatively stationary and the door slides upwardly past the side panel. As the door rises along its tracks beyond a predetermined point, the side panel becomes engaged and travels upwardly with the sliding door. The ceiling panels, being hinged to the side panel, are likewise carried upwardly into the overhead ceiling compartment once the side panel is engaged with the door. As the door completes its upward motion and comes to rest in its stowed postion in the ceiling compartment, the ceiling panels are swung upwardly away from the opening in the ceiling and stowed compactly adjacent the door.

The sequence is reversed when the door is closed, with the door sliding downwardly over the doorway and the ceiling panels unfoldng and swinging into the ceiling opening. The side panel travels with the door until the ceiling panels are nearly covering the ceiling opening, at which point the side panel stops as the door continues downwardly. The door continues moving downwardly and then outwardly to its final closed position in the doorway. As the door moves into register in the doorway, the side panel and the ceiling panels are locked into their respective positions over the door and in the opening of the ceiling.

The door and panel assembly thus far described is particularly suited to a door having an escape slide container such as that described in the above-referenced patent to Bergman et al. With some modification, the escape slide container can be configured to form a presentable closure member in the ceiling opening when the door is raised.

The combined door and interior panels form an attractive and functional assembly that is automatically stowed in the overhead ceiling compartment when the door is opened and automatically deployed into position when the door is closed. In their deployed positions with the door closed, the foldable panels presentably and protectively cover the ceiling opening and the fuselage wall over the doorway. When the door is stowed overhead, the escape slide container on the door forms a presentable and effective closure member in the ceiling panel. All of this is accomplished within a minimum of overhead compartment space and with all mechanical movements being linked to the door for simplicity and reliability of operation.

These and other aspects of the invention will be more apparent with reference to the following detailed description of the preferred embodiment and the accompanying drawings.

BRIEF DESCRIPTION OF THE DRAWINGS

FIG. 1 is an interior isometric view of the preferred embodiment of an airplane passenger door and foldable interior panel assembly constructed in accordance with the present invention, with portions of the interior cabin paneling removed for purposes of illustration;

FIG. 3 is a side view in cross section of the door assembly of FIG. 1, with the door moved inwardly and slightly upwardly in the initial stage of opening;

FIG. 5 is a cross section of the door assembly of FIG. 1 with the door moved further upwardly and folding the panel assembly into the overhead cabin space;

FIG. 6 is a cross section of the door assembly of FIG. 1 with the door moved further upwardly;

FIG. 7 is a cross section of the door assembly of FIG. 1 with the door moved into its final overhead stowed position, with the ceiling opening closed by the escape slide container affixed to the door;

FIG. 8 is plan view of the ceiling panels as they are positioned with the door closed;

FIG. 9 is an enlarged cross-sectional view of the upper portion of the door and the movable panel assembly with the door in the closed position of FIGS. 1 and 2;

FIG. 10 is an enlarged cross-sectional view of the upper portion of the door and movable panel assembly at the point at which the door engages the movable panels, as shown in FIG. 4;

FIG. 12 is a side view of the rocking cam assembly of FIG. 11 showing the ceiling panels moved upwardly out of engagement with the rocking cam, in the position also illustrated in FIG. 3;

DETAILED DESCRIPTION OF THE PREFERRED EMBODIMENT

Figure 11:
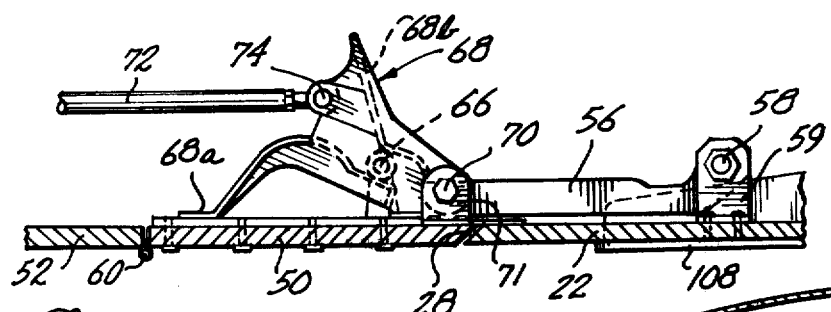
FIG. 11 is a side view of the rocking cam assembly that operates to lock the inboard and outboard ceiling panels in place with the door in the closed position, as shown also in FIG. 2.

FIGS. 1 through 14 illustrate an embodiment of the overhead sliding door and foldable interior panel assembly of the present invention as it is adapted to a main passenger doorway of a commercial airplane.

Referring first to FIGS. 1 through 7, elements of the airplane that do not constitute part of the present invention include a fuselage 18, and an associated outer fuselage skin 20 and interior fuselage wall paneling 21. A cabin ceiling 22 and a cabin floor 24 extend horizontally from the inside of the fuselage 18. The fuselage 18 includes a generally rectangular passenger doorway 25. The top of the doorway 25 is lower than the cabin ceiling 22, and the bottom of the doorway 25 is at the level of the cabin floor 24.

Figure 2:
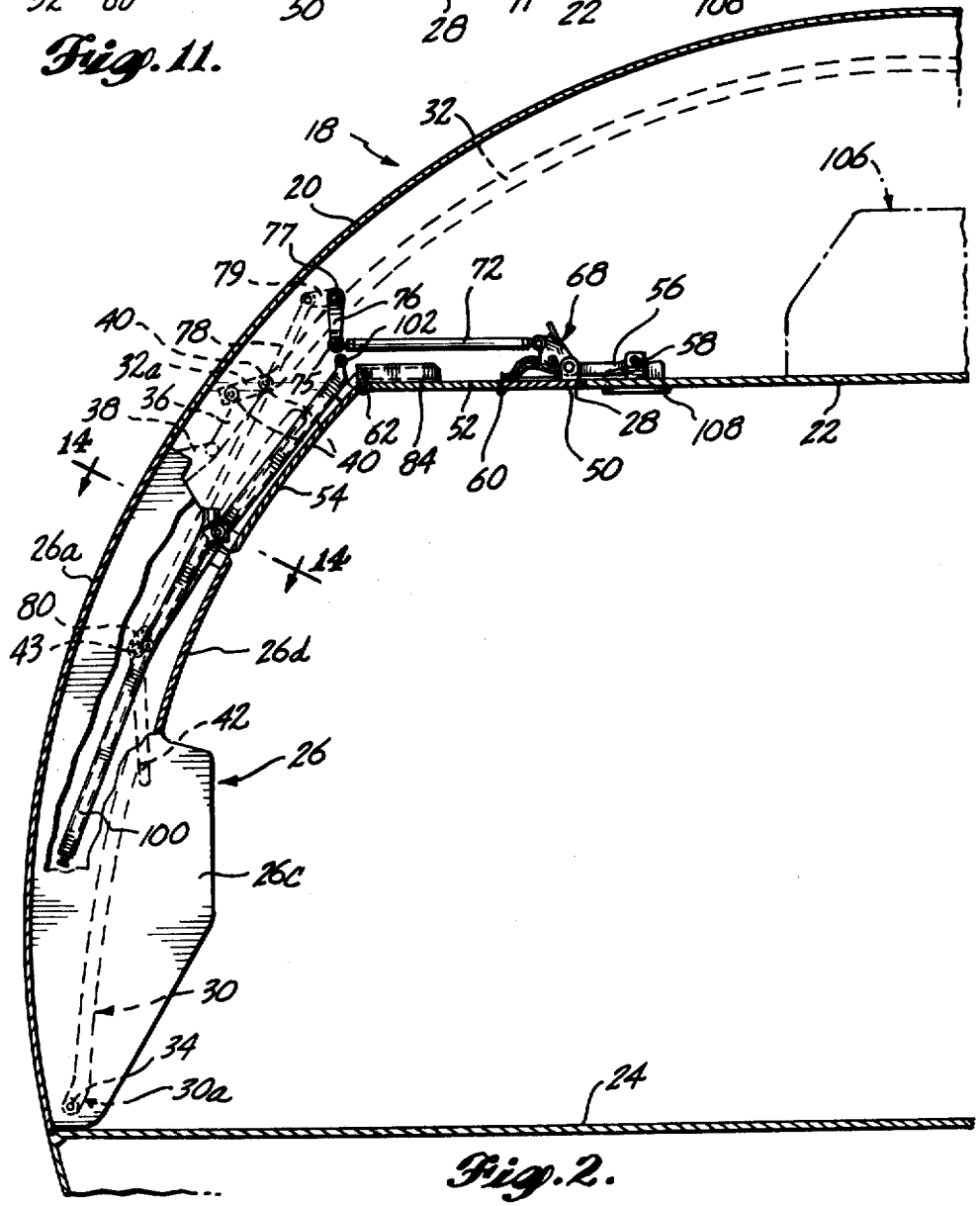
FIG. 2 is a side view in cross section of the door and interior movable panel assembly of FIG. 1, with the door in its closed position and the panels locked in place.
Figure 13:
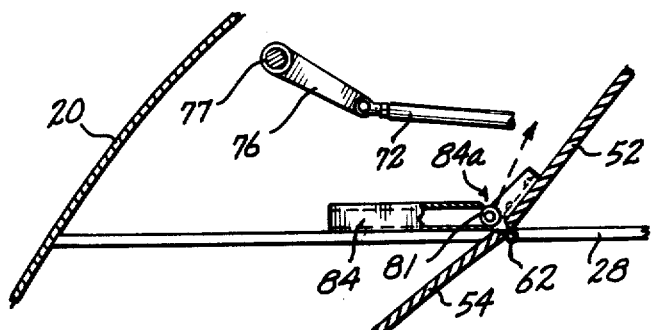
FIG. 13 is a side view of the horizontal track assembly on the ceiling, which operates to guide the movable panels, taken at the point at which the movable panels leave the horizontal track to move upwardly with the door, as also shown in FIG. 4.

The combined door and foldable panel assembly of the invention includes an overhead sliding passenger door 26 and a set of foldable panels, which are more fully described below. The door 26 is movable between a closed position wherein it occupies the doorway 25, as shown in FIGS. 1 and 2, and a fully open position wherein the door 26 is stowed in an overhead position partially above the cabin ceiling 22, as shown in FIG. 7.

Since the door and panel assembly is, with but a few exceptions that will be identified, symmetrical about a vertical centerline, the various elements of the assembly that are symmetrically located on the opposite sides of the door 26 are identified in the following description and in the drawings by like reference numerals, with it being understood that the structures and functions of symmetrical elements identified by the same reference numerals are substantially identical.

The door 26 is of nonmonocoque construction, including generally an outer skin 26a supported on a door frame 26b. A molded escape slide container 26c is affixed to the lower inside portion of the door frame 26b. The escape slide container 26c contains a compactly stowed, inflatable escape slide (not shown) which forms no part of the present invention. Extending upwardly from the top of the escape slide container 26c is a fixedly mounted interior door panel 26d. The door panel 26d is an integral part of the door/slide container assembly and is nonmovable with respect to the door 26. The door panel 26d lies generally parallel to the plane of the door 26 and is positioned to be continuous and coplanar with the adjacent interior wall paneling 21 when the door is closed. The door panel 26d is spaced inwardly from the door frame 26b so as to form an upwardly opening enclosure space between the panel 26d and the frame 26b. The space between the door frame 26b and the door panel 26d is adapted to receive one of the foldable panels when the door 26 is raised, as described more fully below. A reveal window 27 is provided in the door panel 26d; details of the window 27 are omitted in FIGS. 2 through 10 for clarity. Before turning to the structure and function of the foldable panel assembly, the operation of the sliding door 26 is set forth below.

Referring particularly to FIGS. 2 through 7, the door 26 is opened by raising it upwardly through a rectangular opening 28 in the cabin ceiling 22. The door 26 travels on a set of three tracks; a pair of mutually opposing, parallel side tracks 30 affixed to the fuselage 18 along the opposite sides of the doorway 25, and an overhead center track 32 that extends from a point on the fuselage 18 above the doorway 25 upwardly along the interior of the fuselage 18 to a point near the top centerline of the fuselage 18. The lower end of the door 26 is guided along the side tracks 30 by rollers 34 that extend laterally from the base of the door 26. The upper end of the door 26 is guided along the center track 32 by means of a trolley 36. The trolley 36 is pivotably coupled to a bracket 38 affixed to the top of the door 26. Two sets of rollers 40 are journalled to the trolley 36 and are engaged in the center track 32. As illustrated in FIGS. 2 through 7, the center track 32 and the side tracks 30 extend along paths that are generally parallel to the convex curvature of the fuselage 18, but with the exception of outwardly curved end portions 30a and 32a at the lower ends of the tracks 30 and 32, respectively. The outwardly curved track end portions 30a and 32a operate to guide the door 26 inwardly to clear the opening of the doorway 25 so that the door 26 can then travel upwardly along the interior surface of the fuselage 18. Conversely, when the door is lowered the curved track end portions 30a and 32a cause the door 26 to swing outwardly into register with the doorway 25 so as to form a sealed closure between the door 26 and the doorway 25. As the door 26 reaches the lower ends of the tracks 30 and 32, the door skin panel 26a is brought into alignment with the fuselage skin 20 and the interior fixed door panel 26d is brought into alignment with the interior fuselage paneling 21.

The door 26 is unlatched for opening by means of a lever arm 42 positioned beside the doorway 25. The lever arm 42 extends from a shaft 43 that is rotatably mounted on the fuselage 18. Swinging the lever arm 42 upwardly operates through mechanical linkages (not shown) to disengage locking mechanisms (also not shown) that secure the door 26 in place in the doorway 25. Details of the mechanical linkage are fully disclosed in the above-referenced patent to Bergman et al. After being disengaged from the doorway 25, the door 26 may be manually raised to the overhead position, with a constant-force counterbalance spring and cable assembly (not shown) providing assistance to the operator in raising the door 26. Additional details of the structure and function of the door 26 are set forth in the above-referenced patents to Bergman et al. and Baker.

Referring particularly to FIG. 1, the foldable panels include an inboard ceiling panel 50, an outboard ceiling panel 52, and a side panel 54. With the door 26 closed, the inboard and outboard ceiling panels 50 and 52 occupy inboard and outboard portions, respectively, of the ceiling opening 28. The ceiling panels 50 and 52 thus form a presentable closure member that is continuous and coplanar with the cabin ceiling 22. The side panel 54 depends donwardly from the outboard edge of the outboard ceiling panel 52 to the upper edge of the fixed door panel 26d. The side panel 54 thus forms a fuselage panel member over the doorway 25 that is continuous and coplanar with the door panel 26d as well as the interior cabin wall paneling 21 on each side of the door 26. When the door 26 is opened and moved upwardly into the overhead space above the ceiling 22, the movable panels 50, 52 and 54 fold upwardly out of the way, as described further below and as illustrated in FIGS. 2 through 7.

Referring first to FIG. 8, the inboard ceiling panel 50 is pivotably coupled to the ceiling 22 for upward swinging motion. More specifically, a pair of pivot arms 56 are affixed to the opposite upper sides of the inboard ceiling panel 50. The pivot arms 56 extend inboard from the inboard ceiling panel 50 over the inboard edge of the ceiling opening 28. The inboard ends of the pivot arms 56 are pivotably coupled to the upper side of the ceiling 22 by a pair of pivot pins 58 journalled in fixed brackets 59, such that the inboard panel 50 is swingable upwardly, inwardly and away from the ceiling opening 28 on the arms 56 when the door is opened, as shown best in FIG. 12.

The outboard edge of the inboard ceiling panel 50 is pivotably coupled to the inboard edge of the outboard ceiling panel 52 for relative folding motion by means of a piano hinge 60. Likewise, the outboard edge of the outboard ceiling panel 52 is pivotably coupled for folding motion to the upper edge of the side panel 54 by a piano hinge 62. The piano hinge 62 is releasable to enable the side panel 54 to be disconnected from the outboard ceiling panel 52 to provide access to the overhead compartment through the ceiling opening 28. The axes of the piano hinges 60 and 62 are substantially parallel to one another and are also parallel to the fuselage 18 and the cabin ceiling 22. The ceiling panels 50 and 52 are sized to fit snugly inside the ceiling opening 28 to form a presentable closure. A pair of stops 51 (shown in FIG. 8) extend from the inboard panel 50 and rest on the ceiling 22 to position the bottom surfaces of the panels 50 and 52 in even alignment with the ceiling 22.

Referring particularly to FIGS. 8, 11 and 12, a shaft 64 extends across the top of the inboard ceiling panel 50 and is affixed to the pivot arms 56. The opposite ends of the shaft 64 extend beyond the pivot arms 56 and over the ceiling 22 on the opposite sides of the ceiling opening 28. Rollers 66 are rotatably mounted on the opposite ends of the shaft 64. The rollers 66 are engageable in rocking cams 68 that are pivotably connected to the upper side of the ceiling. More specifically, the rocking cams 68 are pivotably connected by pivot pins 70 to brackets 71 which are affixed to the upper side of the ceiling 22 adjacent the opposite sides of the inboard panel 50 and the ceiling opening 28.

The rocking cams 68 are driven to swing about the pivot pins 70 by a pair of push-pull rods 72. The push-pull rods are pivotably coupled to the rocking cams 68 by pivot pins 74. The push-pull rods 72 extend outboard from the rocking cams 68 along the sides of the ceiling opening 28. The outboard ends of the push-pull rods 72 are pivotably coupled by pivot pins 75 to a pair of bell cranks 76. The bell cranks 76 extend radially from a common torque tube 77 that is rotatably affixed to the fuselage 18 over the doorway 25 and above the level of the cabin ceiling 22 (shown in FIGS. 8 and 10, for example). The torque tube 77 is linked mechanically to the lever arm 42 through a push-pull rod 78 that extends alongside the doorway 25. The push-pull rod 78 is pivotably connected at one end to a bell crank 79 that extends from the torque tube 77. The opposite end of the push-pull rod 78 is pivotably connected to a bell crank 80 that extends from the rotatable shaft 43 from which the lever arm 42 extends. Swinging the lever arm 42 inwardly and upwardly rotates the shaft 43 and acts through the push-pull rod 78 to rotate the torque rod 77 in a counterclockwise direction, as viewed in FIGS. 2, 3, and 10, for example. Such rotation of the torque rod 77 drives the push-pull rods 72 inboard to swing the rocking cams 68 inboard and upwardly about their pivot pins 70, as shown best in FIG. 12.

The rocking cams 68 include lower curved ears 68a and upper curved ears 68b that extend generally outwardly in radial directions from the pivot pins 70. The ears 68a and 68b thus form yoke-like structures that operate through their rotational motion to alternately capture and release the rollers 66 upon closing and opening the door 26. For example, as the cams 68 swing upwardly in response to upward swinging of the lever arm 42, as described above, they open upwardly and thereby release the rollers 66 as well as the ceiling panels 50 and 52 for upward swinging motion during subsequent upward motion of the door 26. Also the cams 68 are configured such that their upward swinging motion about their pivot axes lifts the rollers 66 slightly, together with the attached shaft 64, the pivot arms 56 and the panels 50 and 52. This lifting of the panels 50 and 52 at the shaft 64 effectively breaks the coplanar alignment of the panels 50 and 52 along the piano hinge 60, thereby permitting the ceiling panels 50 and 52 to fold inboard and upwardly, as described further below. In the reverse direction, when the door 26 is being lowered and the panels 50 and 52 swing downwardly into the ceiling opening 28, the lower ears 68a operate to capture and guide the rollers 66 into the cams 68. When the door 26 is finally locked into its closed position by swinging the lever arm 42 downwardly, the upper ears 68b are forcibly swung outboard and downwardly over the rollers 66 to lock the rollers 66 securely into position, thereby also locking the ceiling panels 50 and 52 into place in the ceiling opening 28, as shown in FIGS. 11 and 12.

Referring particularly to FIGS. 8 and 9, a pair of rollers 81 are rotatably mounted on brackets 82 that extend transversely from the opposite sides of the outboard ceiling panel 52 adjacent the piano hinge 62. The rollers 81 are engageable in a pair of horizontal tracks 84. The tracks 84 are mounted on the ceiling 22 and extend along the sides of the ceiling opening 28. The tracks open inwardly toward one another. The tracks 84 are open at their inboard ends 84a to allow the rollers 81 to leave the tracks 84 as the ceiling panels 50 and 52 are folded together and moved inboard. The tracks 84 and the rollers 81 operate to constrain the outboard end of the outboard ceiling panel 52 to move only in horizontal directions so long as the rollers 81 are engaged in the tracks 84. As will be seen below, this effectively prevents upward motion of the side panel 54 until the door 26 moves upwardly to a predetermined point at which the door 26 causes the rollers 81 to exit the inboard ends 84a of the tracks 84.

A pair of arms 90 are affixed to the sides of the movable side panel 54 by pairs of brackets 92 and 94, shown particularly in FIGS. 9 and 10. The arms 90 extend generally parallel to the sides of the side panel 54 and are slightly spaced from the side panel 54 by the brackets 92 and 94. With the door 26 in its closed position, the arms 90 extend downwardly behind the door panel 26d, almost to the bottom of the door panel 26d, as best shown in FIG. 9.

Attached to the lower portion of each arm 90 are a pair of rollers 96 and 98. The rollers 96 and 98 are rotatably mounted on short shafts (not shown) that extend laterally outwardly from the arms 90. The rollers 96 and 98 are engaged in parallel tracks 100 that are affixed to the door frame 26b and extend generally parallel to the plane of the door 26. The function of the arms 90, the rollers 96 and 98, and the tracks 100 is to maintain the side panel 54 in a predetermined orientation with respect to the door panel 26d as the door 26 is moved upwardly.

The tracks 100 extend generally parallel to the sides of the door 26 along most of their length, with the exception of upper curved portions 100a where the tracks 100 curve sharply inboard at their upper ends. The curved portions 100a cause the side panel 54 to remain approximately in its original position as the door 26 is moved sharply inwardly and upwardly in the initial stage of opening illustrated in FIGS. 2 and 3. That is, the curved track portions 100a cause the door panel 26d to move out of alignment with the side panel 54 as the door 26 moves inwardly on opening, such that the side panel 54 is thereafter eclipsed behind the door panel 26d and stowed in the enclosure between the door frame 26b and the door panel 26d as the door 26 is raised.

Figure 4:
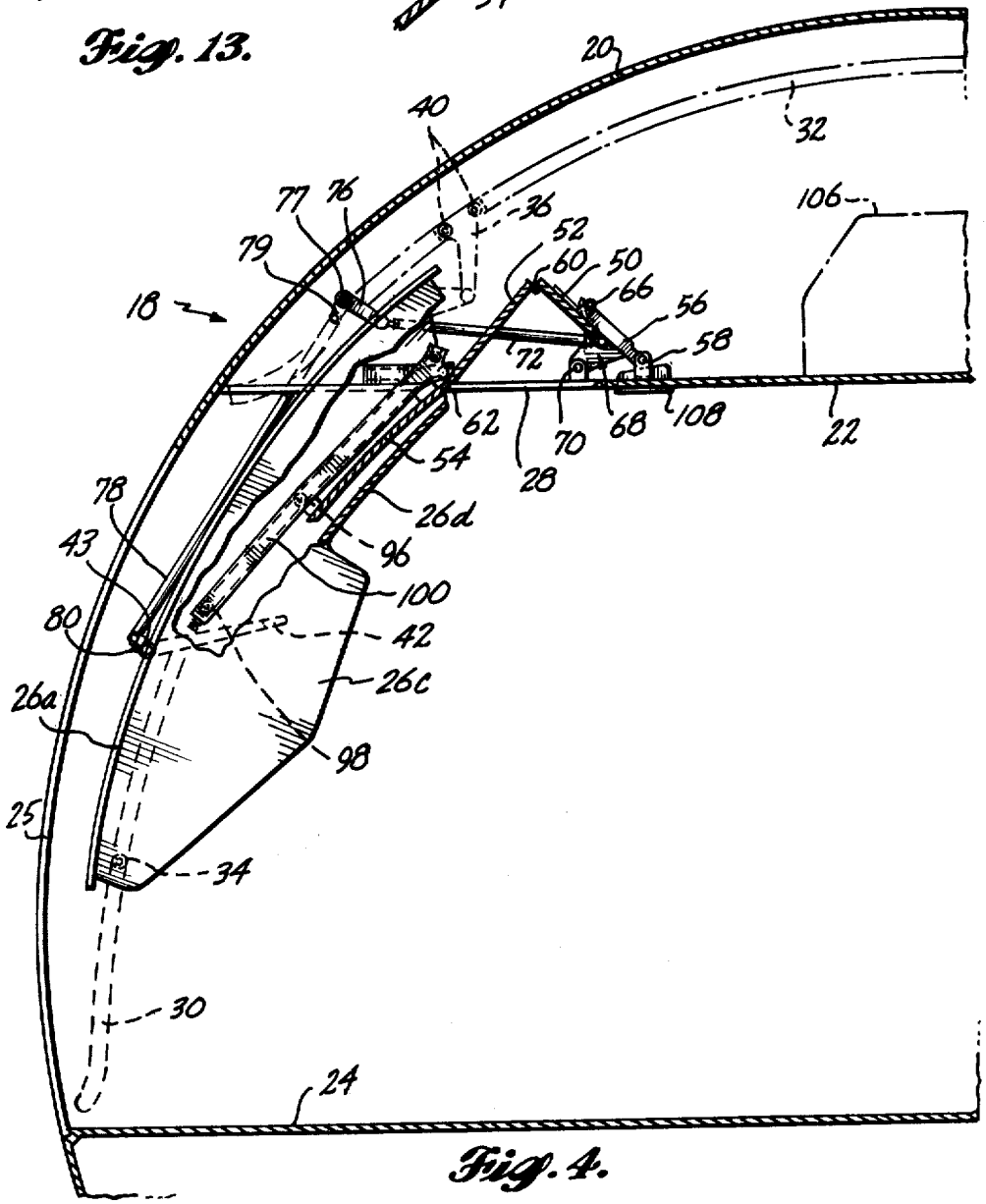
FIG. 4 is a side view in cross section of the door assembly of FIG. 1, with the door slid upwardly to the point where the movable interior panel assembly is engaged by the door for upward motion into the overhead ceiling space.
Figure 14:
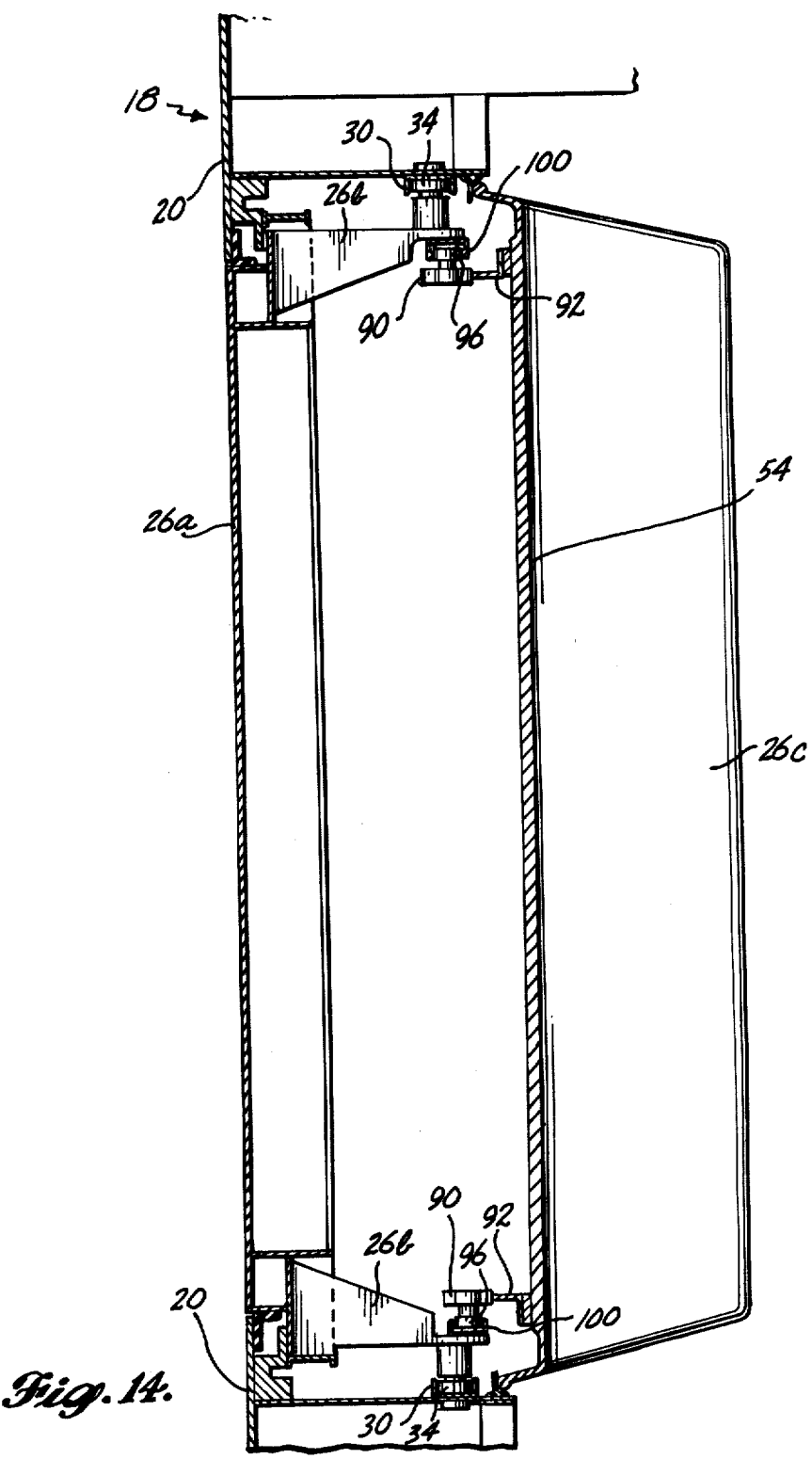
FIG. 14 is a plan view in cross section, taken along section line 14—14 of FIG. 2.

As the door 26 is raised upwardly on its tracks 30 and 32 along a first portion of its travel path, which is illustrated in FIGS. 2 through 4, the rollers 96 and 98 roll freely in the tracks 100 as the side panel 54 is eclipsed behind the door panel 26d. At the end of this first portion of the door's travel path, the rollers 98 abut a pair of adjustable stops 101 located at the lower ends of the tracks 100, as shown in FIGS. 4 and 10. As the door 26 travels over this first portion of its travel path along the tracks 30 and 32, the side panel 54 is prevented from undergoing upward motion due to the rollers 81 being engaged in the overhead horizontal tracks 84, but the side panel 54 is nevertheless free to slide behind the door panel 26d on the rollers 96 and 98. The side panel is also free to rotate slightly as the door 26 rises. In this regard, the door 26 rotates about a fore-and-aft axis because it follows the curved contour of the fuselage. This rotation of the door 26 causes the side panel 54 to undergo the same rotation and thereby causes the rollers 81 to travel inwardly along the overhead horizontal tracks 84 to the open inboard ends 84a, as shown in FIGS. 4 and 10. The stops 101 at the lower ends of the tracks 100 are adjusted, and the inboard ends 84a of the horizontal tracks 84 are located, such that the rollers 81 reach the open ends 84a of the tracks 84 as the lower rollers 98 bottom out against the stops 101 at the ends of the tracks 100, as further discussed below.

At the upper ends of the tracks 100, adjacent the curved portions 100a, are outwardly facing cusps 110b (best shown in FIG. 9). The cusps 100b are sized to cooperably engage a pair of rollers 102 that extend laterally from the upper ends of the arms 90. As the door 26 is raised to the end of the first portion of its travel path (the position of FIGS. 4 and 10), the cusps 100b engage the rollers 102. More specifically, the cusps 100b engage the rollers 102 just as the lower rollers 98 bottom out at the ends of the tracks 100, as shown in FIGS. 4 and 10. The rollers 96, 98, and 102, together with the tracks 100 and the cusps 100b, securely engage the side panel 54 with the door 26 as the door 26 moves upwardly along a second portion of its travel path, which is represented by the sequence of views in FIGS. 4 through 7. Thus, over the first portion of its travel path the door 26 slides upwardly past the side panel 54, eclipsing the panel 54 behind the door panel 26d, whereas along the second portion of its travel path the door 26 securely engages the side panel 54 and carries it upwardly into the overhead space above the cabin ceiling 22. This effectively forms a lost-motion coupling between the door 26 and the side panel 54, by which the door 26 and side panel 54 may be stowed in a compact arrangement above the ceiling 22.

As the lower rollers 98 engage the stops 101 at the bottoms of the tracks 100, and as the rollers 102 are simultaneously captured in the cusps 100b, the rollers 81 leave the inboard ends 84a of the horizontal tracks 84 and thereby free the movable panels 50, 52 and 54 for upward motion. The panels 50, 52 and 54 then swing upwardly as the door 26 continues to move upwardly from the position of FIGS. 4, 10 and 13, as shown in FIGS. 5 through 7. Continuing upward movement of the door 26 and the side panel 54 causes the ceiling panels 50 and 52 to fold together along the piano hinge 60 and also causes the inboard ceiling panel 50 to swing upwardly on its pivot arms 56. In so doing, the cam rollers 66 swing upwardly out of the rocking cams 68 to the position shown in FIG. 5.

Continued upward motion of the door 26, from the position shown in FIG. 5, causes the inboard ceiling panel 50 to swing on its arms 56 about the axes of the pivot pins 58 to a transient position wherein the panel 50 is approximately 180° from its initial, closed position and lies doubled back, almost flat, against the ceiling 22, as shown in FIG. 6.

Continued upward movement of the door 26, from the position of FIG. 6, reverses the direction of pivotal movement of the inboard ceiling panel 50 by drawing it back toward a position of partial alignment with the outboard ceiling panel 52 as the door reaches its overhead stowed position, as shown in FIG. 7. As the door reaches the overhead stowed position of FIG. 7, the lower portion of the escape slide container 26c moves into position to form a closure in the ceiling opening 28, thereby selling the opening 28 against air drafts and forming a suitably presentable closure member while the passenger doorway 25 is in use.

It will be noted that throughout the range of motion of the door 26, as represented in FIGS. 2 through 7, there is a central enclosure space in the overhead ceiling compartment, represented by the dashed lines 106, which remains clear of the door and the movable panels. This enclosure space 106 carries electrical wiring, control cables, and ducting. Thus, the door 26 and the movable panels 50, 52 and 54 are stowed in the overhead compartment without affecting the normal placement of the control and electrical cables and ducting. Also, the ordinary positions of cabin ceiling lights, shown as 108 in FIG. 1, are not affected by the overhead door and movable panel assembly.

Although the present invention is depicted and described by reference to a preferred embodiment, it will be understood that various modifications, alterations and substitutions that may be apparent to one of ordinary skill in the art may be made without departing from the essential spirit of the invention. Accordingly, the scope of the invention is defined by the following claims.

The embodiments of the invention in which an exclusive property or privilege is claimed are defined as follows:

1. In combination with a convexly contoured vehicle fuselage having an exterior passenger doorway and a generally horizontal cabin ceiling with a ceiling opening therein above said doorway, and wherein the top of said doorway is lower than said cabin ceiling, an overhead sliding door and cooperable retracting, foldable cabin panel assembly comprising:

an overhead sliding door movable along a predetermined travel path between a closed position occupying said doorway and an overhead stowed position wherein at least a portion of said door is located above said cabin ceiling, said travel path extending upwardly through said ceiling opening from said doorway;

foldable interior cabin panels including an inboard ceiling panel, an outboard ceiling panel and a side panel successively hinged together edgewise for mutual folding motion about mutually parallel axes of rotation extending substantially parallel to said fuselage and said cabin ceiling, said inboard and outboard ceiling panels being operable to occupy inboard and outboard portions respectively of said ceiling opening with said door closed, said inboard ceiling panel being pivotably connected to said ceiling for swinging motion between a closed position occupying said inboard portion of said ceiling opening and a range of positions wherein said inboard ceiling panel is swung upwardly and inwardly therefrom about a pivot axis extending generally parallel to said fuselage and said cabin ceiling, said side panel depending downwardly from the outboard edge of said outboard ceiling panel with said door in said closed position to thereby cover a portion of the fuselage above the doorway; and lost motion coupling means connecting said side panel to said door whereby said door travels upwardly alongside said side panel along a first portion of said travel path of said door, and whereby initial inboard motion of said door upon opening operates through said lost motion coupling and said side panel to partially fold said ceiling panels inboard along said ceiling opening to thereby permit said door to pass through said ceiling opening as said door travels over said first portion of said travel path, and further whereby said door engages said side panel for conjoint motion of said door and said side panel along a second portion of said travel path extending to the end of said travel path, and whereby said ceiling panels are swung upwardly and inwardly over said ceiling as said door is raised to said overhead stowed position at the end of said travel path.

2. The overhead sliding door and cabin panel assembly defined in claim 1 wherein said door includes means forming a closure member adapted to occupy said ceiling opening with said door in said overhead stowed position, whereby said ceiling opening is effectively closed with said door in said closed position as well as in said overhead stowed position.

3. The overhead sliding door and interior chain panel assembly defined in claim 1 or 2 wherein said lost motion coupling means connecting said side panel to said door comprises a pair of tracks affixed to the opposite sides of said door, said side panel including roller means engaged in said tracks, whereby said door is movable along said first portion of said travel path with said roller means of said side panel slidably engaged in said tracks, and stop means associated with said tracks to abut said roller means of said side panels as said door moves from said first portion of said travel path to said second portion of said travel path to thereby engage said side panel with said door for conjoint motion along said second portion of said travel path.

4. The overhead sliding door and foldable cabin panel assembly defined in claim 3 wherein said door includes an interior door panel affixed to said door so as to be aligned edgewise with and positioned below said side panel with said door in said closed position, said door panel being spaced inwardly from said door to form an enclosure between said door panel and said door whereby said side panel is inserted into said enclosure as said door is moved upwardly alongside said side panel over said first portion of said travel path.

5. The overhead sliding door and foldable cabin panel assembly defined in claim 1 or 2 wherein said door includes an interior door panel affixed to said door so as to be aligned edgewise with and positioned below said side panel with said door in said closed position, said door panel being spaced inwardly from said door to form an enclosure between said door panel and said door whereby said side panel is inserted into said enclosure as said door is moved upwardly alongside said side panel over said first portion of said travel path.

6. The overhead sliding door and foldable cabin panel assembly defined in claim 3 wherein said roller means of said side panel are journalled to extension arms affixed to the opposite sides of said side panel and extending downwardly from the lower edge of said side panel with said door in said closed position.

7. the overhead sliding door and foldable cabin panel assembly defined in claim 4 wherein said roller means of said side panel are journalled to extension arms affixed to opposite sides of said side panel and extending downwardly from the lower edge of said side panel to be engaged in said tracks affixed to the opposite sides of said door, said tracks including inwardly curved portions at their upper ends that operate to guide said side panel out of edgewise alignment with said fixed door panel and into said enclosure formed between said door and said fixed door panel as said door is moved inwardly to clear the doorway upon opening and upwardly along said first portion of said travel path of said door.

8. The overhead sliding door and foldable cabin panel assembly defined in claim 1 or 2 wherein said inboard and outboard ceiling panels are pivotably coupled in coplanar parallel alignment to form a substantially planar closure member in said ceiling opening with said door in said closed position, and wherein said assembly further includes means for mechanically breaking the coplanar parallel alignment of said inboard and outboard ceiling panels upon said door being opened to thereby permit said inboard and outboard ceiling panels to undergo relative folding motion.

9. The overhead sliding door and interior cabin panel assembly defined in claim 8 wherein said means for mechanically breaking the coplanar parallel alignment of said inboard and outboard ceiling panels upon opening of said door includes a pair of rocking cams pivotably connected to the upper side of said ceiling on opposite sides of said ceiling opening, said inboard ceiling panel including laterally extending roller means engageable in said rocking cams, and linkage means connecting said rocking cams to said door whereby initial movement of said door from said closed position causes said rocking cams to rotate and release said roller means of said inboard ceiling panel and break the coplanar parallel alignment of said inboard and outboard ceiling panels, and further whereby upon closing of said door said linkage means operates to rotate said roller cams to engage said roller means of said inboard ceiling panel to bring said inboard and outboard ceiling panels into coplanar parallel aignment occupying said ceiling opening.

10. The overhead sliding door and interior cabin panel assembly defined in claim 9 further comprising horizontal tracks affixed to said ceiling adjacent the opposite sides of said ceiling opening and extending inwardly from the outboard edge of said ceiling opening, said outboard ceiling panel including laterally extending rollers engageable in said horizontal tracks, said horizontal tracks being open at their inboard ends, whereby said outboard edge of said outboard ceiling panel is generally constrained to follow a horizontal path during said inward folding motion of said inboard and outboard ceiling panels as said door is initially moved along said first portion of said travel path, said horizontal tracks being adapted such that said rollers of said outboard ceiling panels exit said open ends of said horizontal tracks as said door engages said side panel for conjoint motion of said door and said side panel along said second portion of said travel path of said door.

11. The overhead sliding door and foldable cabin panel assembly defined in claim 4 wherein said inboard and outboard ceiling panels are pivotably coupled in coplanar parallel alignment to form a substantially planar closure member in said ceiling opening with said door in said closed position, and wherein said assembly further includes means for mechanically breaking the coplanar parallel alignment of said inboard and outboard ceiling panels upon said door being opened to thereby permit said inboard and outboard ceiling panels to undergo relative folding motion.

12. The overhead sliding door and interior cabin panel assembly defined in claim 11 wherein said means for mechanically breaking the coplanar parallel alignment of said inboard and outboard ceiling panels upon opening of said door includes a pair of rocking cams pivotably connected to the upper side of said ceiling on opposite sides of ceiling opening, said inboard ceiling panel including laterally extending roller means engageable in said rocking cams, and linkage means connecting said rocking cams to said door whereby initial movement of said door from said closed position causes said rocking cams to rotate and release said roller means of said inboard ceiling panel and break the coplanar parallel alignment of said inboard and outboard ceiing panels, and further whereby upon closing of said door said linkage means operates to rotate said roller cams to engage said roller means of said inboard ceiling panel to bring said inboard and outboard ceiling panels into coplanar parallel alignment occupying said ceiling opening.

13. The overhead sliding door and interior cabin panel assembly defined in claim 12 further comprising horizontal tracks affixed to said ceiling adjacent the opposite sides of said ceiling opening and extending inwardly from the outboard edge of said ceiling opening, said outboard ceiling panel including laterally extending rollers engageable in said horizontal tracks, said horizontal tracks being open at their inboard ends, whereby said outboard edge of said outboard ceiling panel is generally constrained to follow a horizontal path during said inward folding motion of said inboard and outboard ceiling panels as said door is initially moved along said first portion of said travel path, said horizontal tracks being adapted such that said rollers of said outboard ceiling panels exit said open ends of said horizontal tracks as said door engages said side panel for conjoint motion of said door and said side panel along said second portion of said travel path of said door.

* * * * *